United States Patent
Oe

(10) Patent No.: US 9,639,129 B2
(45) Date of Patent: *May 2, 2017

(54) HYDROELECTRIC POWER GENERATION PLAN ADJUSTMENT DEVICE, HYDROELECTRIC POWER GENERATION PLAN ADJUSTMENT METHOD, AND PROGRAM

(75) Inventor: Ryuji Oe, Hiroshima (JP)

(73) Assignee: The Chugoku Electric Power Co., Inc., Hiroshima (JP)

( * ) Notice: Subject to any disclaimer, the term of this patent is extended or adjusted under 35 U.S.C. 154(b) by 849 days.

This patent is subject to a terminal disclaimer.

(21) Appl. No.: 13/702,467

(22) PCT Filed: Mar. 31, 2011

(86) PCT No.: PCT/JP2011/058171
§ 371 (c)(1),
(2), (4) Date: Feb. 7, 2013

(87) PCT Pub. No.: WO2011/155251
PCT Pub. Date: Dec. 15, 2011

(65) Prior Publication Data
US 2013/0144455 A1    Jun. 6, 2013

(30) Foreign Application Priority Data

Jun. 8, 2010 (JP) ................ 2010-131319

(51) Int. Cl.
*G06Q 10/00* (2012.01)
*G06Q 30/00* (2012.01)
(Continued)

(52) U.S. Cl.
CPC ............ *G06F 1/26* (2013.01); *G06Q 10/04* (2013.01); *G06Q 10/06* (2013.01);
(Continued)

(58) Field of Classification Search
CPC ... G06Q 30/0206; G06Q 10/067; Y04S 50/10
See application file for complete search history.

(56) References Cited

U.S. PATENT DOCUMENTS

| | | | |
|---|---|---|---|
| 6,681,156 B1 * | 1/2004 | Weiss | 700/291 |
| 2010/0138363 A1 * | 6/2010 | Batterberry et al. | 705/412 |
| 2011/0027107 A1 * | 2/2011 | Bekken | 417/330 |

FOREIGN PATENT DOCUMENTS

| | | |
|---|---|---|
| JP | 2000-184592 | 6/2000 |
| JP | 2001-211548 | 8/2001 |

(Continued)

OTHER PUBLICATIONS

Japanese Office Action for priority document JP 2010-131319.
(Continued)

*Primary Examiner* — George Chen
(74) *Attorney, Agent, or Firm* — Harness, Dickey & Pierce, P.L.C.

(57) ABSTRACT

The economical load distribution adjusting device 10 acquires an optimal hydroelectric output, optimal demand, and optimal power price from the supply-demand planning device 23, acquires the planned hydroelectric output planned by the water level planning devices 21, and acquires a planned demand planned by the hot water tank temperature control devices 22. The economical load distribution adjusting device 10 reduces the power price of the time at which the planned hydroelectric output exceeds the optimal output and makes the water level planning devices 21 replan the hydroelectric output, and raises the power price of the time at which the planned demand exceeds the optimal demand and makes the hot water tank temperature control devices 22 replan the amount of demand.

9 Claims, 22 Drawing Sheets

(51) Int. Cl.
G06F 1/26 (2006.01)
G06Q 10/04 (2012.01)
G06Q 10/06 (2012.01)
G06Q 50/06 (2012.01)
H02J 3/00 (2006.01)
G01R 11/56 (2006.01)
G01R 21/133 (2006.01)
G01F 17/00 (2006.01)

(52) U.S. Cl.
CPC ....... *G06Q 10/06312* (2013.01); *G06Q 50/06* (2013.01); *H02J 3/00* (2013.01); *Y02E 10/226* (2013.01); *Y02E 40/76* (2013.01); *Y04S 10/54* (2013.01); *Y04S 10/545* (2013.01)

(56) References Cited

FOREIGN PATENT DOCUMENTS

| | | |
|---|---|---|
| JP | 2002-271982 | 9/2002 |
| JP | 2002-281665 | 9/2002 |
| JP | 2003-111275 | 4/2003 |
| JP | 2005-051866 | 2/2005 |
| JP | 2005-258689 | 9/2005 |
| JP | 2006-260004 | 9/2006 |
| JP | 2006-260431 | 9/2006 |
| JP | 2007-108933 | 4/2007 |
| JP | 2007-159239 | 6/2007 |
| JP | 2007-244160 | 9/2007 |
| JP | 2007-257019 | 10/2007 |
| JP | 2008-052443 | 3/2008 |
| JP | 2008-118810 | 5/2008 |
| JP | 2009-223692 | 10/2009 |
| JP | 2009-257703 | 11/2009 |

OTHER PUBLICATIONS

International Search Report for PCT/JP2011/058171, ISA/JP, mailed Jun. 28, 2011.
Watanabe et.al., Simulation of Electricity Market—Development of Basic Market Model with Unit Commitment-, [online], Mar. 2004, Central Research Institute of Electric Power Industry, [Searched Apr. 23, 2010], Web site (URL), <http://criepi.denken.or.jp/jp/kenkikaku/report/detail/R03016.html>.
Isamu Watanabe, Nobuyuki Yamaguchi, Takayuki Shiina, and Ikuo Kurihara, "Agent-based Simulation Model of Electricity Market with Stochastic Unit Commitment", 8th International Conference on Probabilistic Methods Applied to Power Systems, Iowa State University, Ames, Iowa, Sep. 12-16, 2004, 6 pages.
http://criepi.denken.or.jp/jp/kenkikaku/report/detail/R03016.html.
European Search Report, Patent Application No. 11792209.6, Jun. 26, 2015.

* cited by examiner

PRICE LIST 61

| TIME | POWER PLANT 1 | POWER PLANT 2 | POWER PLANT 3 | POWER PLANT 4 | POWER PLANT 5 |
|---|---|---|---|---|---|
| 1 | 4.62 | 4.62 | 4.62 | 4.62 | 4.62 |
| 2 | 4.46 | 4.46 | 4.46 | 4.46 | 4.46 |
| ... | ... | ... | ... | ... | ... |
| 13 | 10.00 | 10.00 | 10.00 | 10.00 | 10.00 |
| 14 | 9.62 | 9.62 | 9.62 | 9.62 | 9.62 |
| ... | ... | ... | ... | ... | ... |
| 24 | 4.62 | 4.62 | 4.62 | 4.62 | 4.62 |

FIG. 7

| OUTPUT LIST | | | | | | |
|---|---|---|---|---|---|---|
| TIME | POWER PLANT 1 | POWER PLANT 2 | POWER PLANT 3 | POWER PLANT 4 | POWER PLANT 5 | HOURLY TOTAL |
| 1 | 0 | 0 | 0 | 0 | 0 | 0 |
| 2 | 0 | 0 | 0 | 0 | 0 | 0 |
| ... | ... | ... | ... | ... | ... | ... |
| 13 | 50 | 100 | 150 | 200 | 250 | 750 |
| 14 | 50 | 100 | 150 | 200 | 250 | 750 |
| ... | ... | ... | ... | ... | ... | ... |
| 24 | 0 | 0 | 0 | 0 | 0 | 0 |
| DAILY TOTAL | 200 | 400 | 600 | 800 | 1000 | 3000 |

63

| LIMITING CONDITIONS | POWER PLANT 1 | | POWER PLANT 2 | | POWER PLANT 3 | | POWER PLANT 4 | | POWER PLANT 5 | |
|---|---|---|---|---|---|---|---|---|---|---|
| TIME | Qmin | Qmax | Qmin | Qmax | Qmin | Qmax | Qmin | Qmax | Qmin | Qmax |
| 1 | 0 | 8.0 | 0 | 8.0 | 0 | 8.0 | 0 | 8.0 | 0 | 8.0 |
| 2 | 0 | 8.0 | 0 | 8.0 | 0 | 8.0 | 0 | 8.0 | 0 | 8.0 |
| ... | ... | ... | ... | ... | ... | ... | ... | ... | ... | ... |
| 13 | 0 | 8.0 | 0 | 8.0 | 0 | 8.0 | 0 | 8.0 | 0 | 8.0 |
| 14 | 0 | 8.0 | 0 | 8.0 | 0 | 8.0 | 0 | 8.0 | 0 | 8.0 |
| ... | ... | ... | ... | ... | ... | ... | ... | ... | ... | ... |
| 24 | 0 | 8.0 | 0 | 8.0 | 0 | 8.0 | 0 | 8.0 | 0 | 8.0 |

FIG. 9

PRICE LIST (AFTER SORTING) 61

| TIME | POWER PLANT 5 | POWER PLANT 4 | POWER PLANT 3 | POWER PLANT 2 | POWER PLANT 1 |
|---|---|---|---|---|---|
| 1 | 4.62 | 4.62 | 4.62 | 4.62 | 4.62 |
| 2 | 4.46 | 4.46 | 4.46 | 4.46 | 4.46 |
| ... | ... | ... | ... | ... | ... |
| 13 | 10.00 | 10.00 | 10.00 | 10.00 | 10.00 |
| 14 | 9.62 | 9.62 | 9.62 | 9.62 | 9.62 |
| ... | ... | ... | ... | ... | ... |
| 24 | 4.62 | 4.62 | 4.62 | 4.62 | 4.62 |

FIG. 10

OUTPUT LIST (AFTER SORTING)

| TIME | POWER PLANT 5 | POWER PLANT 4 | POWER PLANT 3 | POWER PLANT 2 | POWER PLANT 1 | HOURLY TOTAL |
|---|---|---|---|---|---|---|
| 1 | 0 | 0 | 0 | 0 | 0 | 0 |
| 2 | 0 | 0 | 0 | 0 | 0 | 0 |
| ... | ... | ... | ... | ... | ... | ... |
| 13 | 250 | 200 | 150 | 100 | 50 | 750 |
| 14 | 250 | 200 | 150 | 100 | 50 | 750 |
| ... | ... | ... | ... | ... | ... | ... |
| 24 | 0 | 0 | 0 | 0 | 0 | 0 |
| DAILY TOTAL | 1000 | 800 | 600 | 400 | 200 | 3000 |

FIG. 11

TIME TABLE IN
ORDER OF OUTPUT 64

| k | t(k) |
|---|---|
| 1 | 13 |
| 2 | 14 |
| ⋮ | ⋮ |
| 24 | 24 |

FIG. 12

PRICE LIST 61

| TIME | POWER PLANT 5 | POWER PLANT 4 | POWER PLANT 3 | POWER PLANT 2 | POWER PLANT 1 |
|---|---|---|---|---|---|
| 1 | 4.62 | 4.62 | 4.62 | 4.62 | 4.62 |
| 2 | 4.46 | 4.46 | 4.46 | 4.46 | 4.46 |
| ... | ... | ... | ... | ... | ... |
| 13 | 10.00 | 10.00 | 10.00 | 10.00 | 0.01 |
| 14 | 9.62 | 9.62 | 9.62 | 9.62 | 9.62 |
| ... | ... | ... | ... | ... | ... |
| 24 | 4.62 | 4.62 | 4.62 | 4.62 | 4.62 |

LIMITING CONDITIONS

63

| TIME | POWER PLANT 1 | | POWER PLANT 2 | | POWER PLANT 3 | | POWER PLANT 4 | | POWER PLANT 5 | |
|---|---|---|---|---|---|---|---|---|---|---|
| | Qmin | Qmax | Qmin | Qmax | Qmin | Qmax | Qmin | Qmax | Qmin | Qmax |
| 1 | 0 | 8.0 | 0 | 8.0 | 0 | 8.0 | 0 | 8.0 | 0 | 8.0 |
| 2 | 0 | 8.0 | 0 | 8.0 | 0 | 8.0 | 0 | 8.0 | 0 | 8.0 |
| ... | ... | ... | ... | ... | ... | ... | ... | ... | ... | ... |
| 13 | 0 | 8.0 | 6.0 | 6.0 | 6.5 | 6.5 | 7.0 | 7.0 | 7.5 | 7.5 |
| 14 | 0 | 8.0 | 0 | 8.0 | 0 | 8.0 | 0 | 8.0 | 0 | 8.0 |
| ... | ... | ... | ... | ... | ... | ... | ... | ... | ... | ... |
| 24 | 0 | 8.0 | 0 | 8.0 | 0 | 8.0 | 0 | 8.0 | 0 | 8.0 |

FIG. 14

| LIMITING CONDITIONS | | | | | | | | | | | |
|---|---|---|---|---|---|---|---|---|---|---|---|
| | CALORIFIER 1 | | CALORIFIER 2 | | CALORIFIER 3 | | CALORIFIER 4 | | CALORIFIER 5 | |
| TIME | MINIMUM CARRIED CURRENT | MAXIMUM CARRIED CURRENT | MINIMUM CARRIED CURRENT | MAXIMUM CARRIED CURRENT | MINIMUM CARRIED CURRENT | MAXIMUM CARRIED CURRENT | MINIMUM CARRIED CURRENT | MAXIMUM CARRIED CURRENT | MINIMUM CARRIED CURRENT | MAXIMUM CARRIED CURRENT |
| 1 | 0 | 150 | 0 | 150 | 0 | 150 | 0 | 150 | 0 | 150 |
| 2 | 0 | 150 | 0 | 150 | 0 | 150 | 0 | 150 | 0 | 150 |
| ... | ... | ... | ... | ... | ... | ... | ... | ... | ... | ... |
| 13 | 0 | 150 | 0 | 150 | 0 | 150 | 0 | 150 | 0 | 150 |
| 14 | 0 | 150 | 0 | 150 | 0 | 150 | 0 | 150 | 0 | 150 |
| ... | ... | ... | ... | ... | ... | ... | ... | ... | ... | ... |
| 24 | 0 | 150 | 0 | 150 | 0 | 150 | 0 | 150 | 0 | 150 |

FIG. 17

TIME TABLE IN
ORDER OF DEMAND ~74

| k | t(k) |
|---|---|
| 1 | 5 |
| 2 | 6 |
| ⋮ | ⋮ |
| 24 | 24 |

FIG. 18

PRICE LIST (AFTER SORTING) 71

| TIME | CALORIFIER 3 | CALORIFIER 1 | CALORIFIER 2 |
|---|---|---|---|
| ⋮ | ⋮ | ⋮ | ⋮ |
| 5 | 4.00 | 4.00 | 4.00 |
| 6 | 4.08 | 4.08 | 4.08 |
| 7 | 2.69 | 2.69 | 2.69 |
| 8 | 3.08 | 3.08 | 3.08 |
| ⋮ | ⋮ | ⋮ | ⋮ |
| 24 | 4.62 | 4.62 | 4.62 |

FIG. 19

DEMAND LIST (AFTER SORTING)

| TIME | CALORIFIER 3 | CALORIFIER 1 | CALORIFIER 2 | HOURLY TOTAL |
|---|---|---|---|---|
| ⋮ | ⋮ | ⋮ | ⋮ | ⋮ |
| 5 | 60 | 45 | 45 | 150 |
| 6 | 60 | 45 | 45 | 150 |
| 7 | 60 | 45 | 45 | 150 |
| 8 | 60 | 45 | 45 | 150 |
| ⋮ | ⋮ | ⋮ | ⋮ | ⋮ |
| 24 | 0 | 0 | 0 | 0 |
| DAILY TOTAL | 240 | 180 | 180 | 1200 |

FIG. 20

PRICE LIST

| TIME | CALORIFIER 3 | CALORIFIER 1 | CALORIFIER 2 |
|---|---|---|---|
| ⋮ | ⋮ | ⋮ | ⋮ |
| 5 | 4.00 | 99 | 99 |
| 6 | 4.08 | 4.08 | 4.08 |
| 7 | 2.69 | 2.69 | 2.69 |
| 8 | 3.08 | 3.08 | 3.08 |
| ⋮ | ⋮ | ⋮ | ⋮ |
| 24 | 4.62 | 4.62 | 4.62 |

FIG. 21

HYDROELECTRIC POWER GENERATION PLAN ADJUSTMENT DEVICE, HYDROELECTRIC POWER GENERATION PLAN ADJUSTMENT METHOD, AND PROGRAM

CROSS-REFERENCE TO RELATED APPLICATIONS

This application is a 371 U.S. National Stage of International Application No. PCT/JP2011/058171, filed Mar. 31, 2011, which claims the benefit of Japanese Patent Application No. 2010-131319, filed Jun. 8, 2010. The disclosures of the above applications are incorporated herein by reference.

TECHNICAL FIELD

The present invention relates to a hydroelectric power demand plan adjusting device, a hydroelectric power demand plan adjusting method and a program.

BACKGROUND ART

Planning of economical load distribution has been conducted to keep the total power generation cost including such as fuel and start-up expenses at minimum, or maximizing the selling price of generated power while satisfying the demand for power using various mathematical programming. For example, NPL 1 discloses a technology of planning power demand and power supply so that the 24-hour power generation cost is kept at minimum. And PTL 1 discloses a technology of planning the water level of a reservoir so that the price of generated power is maximized. Further, there is a case where the power price for the next day is presented to a customer for the customer to check and determine the amount of electric power demand to use. For example, PTL 2 discloses a technology of controlling the temperature of hot water in a calorifier type tank so that the electric power cost for heating is minimized. In recent years, experiments are being performed to control the demand with real-time power prices which is called a smart grid.

CITATION LIST

Patent Literature

[PTL 1]
Japanese Patent Application Laid-open Publication No. 2009-223692
[PTL 2]
Japanese Patent Application Laid-open Publication No. 2009-257703

Non Patent Literature

[NPL 1]
Watanabe et.al., Simulation of Electricity Market-Development of Basic Market Model with Unit Commitment-, [online] , March 2004, Central Research Institute of Electric Power Industry, [Searched Apr. 23, 2010] , Web site (URL), <http://criepi.denken.or.jp/jp/kenkikaku/report/detail/R03016.html>

SUMMARY OF INVENTION

Technical Problem

However, with conventional technology various optimal plans, for example, power generation plans for thermal power generation, power generation plans for hydro power generation, hot water plans for calorifiers and the like have been independently conducted so that there is a possibility that an optimal plan is not necessarily carried out as a whole.

The present invention has been made in view of such foregoing background and an object thereof is to provide a hydroelectric power demand plan adjusting device, a hydroelectric power demand plan adjusting method and a program that can adjust a plurality of plans that have been calculated separately.

Solution to Problem

The main aspect of the present invention for solving the aforementioned problem is a hydroelectric power plan adjusting device for adjusting a plan of the hydroelectric power, communicatively connected to each of a supply-demand planning device and a hydroelectric power planning device, the supply-demand planning device calculating an optimal value of output per unit time by hydroelectric power as well as calculating an optimal value of power price per the unit time, and the hydroelectric power planning device planning an output by the hydroelectric power generation in accordance with the power price, the device including, an optimal supply-demand plan acquiring unit configured to acquire from the supply-demand planning device an optimal value of the output and an optimal value of the power price per the unit time, an optimal output acquiring unit configured to control the hydroelectric power planning device to plan the output according to the power price and acquire a planned value of the output from the hydroelectric power planning device, and a price adjusting unit configured to reduce the power price for the unit time at which the planned value of the output exceeds the optimal value of the output and controls the hydroelectric power planning device so that the output is planned according to the reduced power price.

According to the hydroelectric power plan adjusting device of the present invention, the hydroelectric power plan adjusting device can be made to recalculate the planned output after reducing the power price during a unit period when the planned output exceeds the optimal output. It is favorable for output that more electricity is generated when the power price is high. Therefore, the hydroelectric power demand plan adjusting device is expected to recalculate so that the output is reduced when the power price is lowered. In this way, the planned output can be brought close to the optimal output.

Further, the hydroelectric power plan adjusting device according to the present invention may have the supply-demand planning device calculate an optimal value of the output by the hydroelectric power generation and an optimal value of power demand of an electrical equipment, and calculate the power price according to the optimal value of the output and the optimal value of the amount of demand, the hydroelectric power plan adjusting device further includes an optimal demand acquiring unit configured to control the demand planning device to plan the amount of demand according to the optimal value of the acquired power price and acquires a planned value of the amount of demand from the demand planning device, and the price adjusting unit further raises the power price for the unit time at which the planned value of the amount of demand exceeds the optimal value of the amount of demand and controls the demand planning device so as to plan the amount of demand according to the raised power price.

In this case, output by hydroelectric power generation can be brought close to the optimal output and electrical demand of electrical equipment can also be brought close to the optimal demand. According to the hydroelectric power plan adjusting device of the present invention, the demand planning device can be made to recalculate the amount of demand after raising the power price during a unit period when the planned demand exceeds the optimal demand. It is favorable that the electrical equipment holds back the demand for power when the power price is high and shifts its demand for power to a time when the power price is lower. Therefore the hydroelectric power demand plan adjusting device is expected to recalculate so that the demand for power is reduced when the power price is raised. In this way, the planned demand can be brought close to the optimal demand.

Additionally, the hydroelectric power plan adjusting device according to the present invention may have the price adjusting unit set a predetermined maximum value to the power price for the unit time at which the planned value of the amount of demand exceeds the optimal value of the amount of demand.

Further, the hydroelectric power plan adjusting device according to the present invention may have the price adjusting unit sets a predetermined minimum value to the power price for the unit time at which the planned value of the amount of demand exceeds the optimal value of the amount of demand.

And according to another aspect of the present inventions is a method of adjusting a plan of hydroelectric power plan, includes a computer communicatively connected to each of a supply-demand planning device and a hydroelectric power planning device, the supply-demand planning device calculating an optimal value of output per unit time by hydroelectric power as well as calculating an optimal value of power price per the unit time, and the hydroelectric power planning device planning output by the hydroelectric power in accordance with the power price, acquiring from the supply-demand planning device an optimal value of the output and the power price per the unit time, controlling the hydroelectric power planning device to plan the output according to the power price and acquiring a planned value of the output from the hydroelectric power planning device, and reducing the power price for the unit time at which the planned value of the output exceeds the optimal value of the output and controlling the hydroelectric power planning device so that the output is planned according to the reduced power price.

Furthermore, the hydroelectric power adjusting method according to the present invention may have the supply-demand planning device has calculated an optimal value of the output by the hydroelectric power generation and an optimal value of power demand of an electrical equipment, and calculates the power price according to the optimal value of the output and the optimal value of the amount of demand, the computer further controls the demand planning device to plan the amount of demand according to the optimal value of the acquired power price and acquires a planned value of the amount of demand from the demand planning device, and the computer controls the hydroelectric power planning device to plan the output according to the reduced power price and further increases the power price for the unit time at which the planned value of the amount of demand exceeds the optimal value of the amount of demand and controls the demand planning device to plan the amount of demand according to the increased power price.

And another aspect of the present invention is a program for adjusting a plan of hydroelectric power generation, the program making a computer, communicatively connected to each of a supply-demand planning device and a hydroelectric planning device, the supply-demand planning device calculating an optimal value of output per unit time by hydroelectric power as well as calculating an optimal value of power price per the unit time, and the hydroelectric planning device planning output by the hydroelectric power in accordance with the power price, perform, a step of acquiring from the supply-demand planning device an optimal value of the output and the power price per the unit time, a step of controlling the hydroelectric power planning device to plan the output according to the power price and acquiring a planned value of the output from the hydroelectric planning device, and a step of reducing the power price for the unit time at which the planned value of the output exceeds the optimal value of the output and controlling the hydroelectric power planning device so that the output is planned according to the reduced power price.

And the program according to the present invention may have the supply-demand planning device calculate an optimal value of the output by the hydroelectric power generation and an optimal value of power demand of an electrical equipment, and calculate the power price according to the optimal value of the output and the optimal value of the amount of demand, the program has the computer further perform a step of controlling the demand planning device to plan the amount of demand according to the optimal value of the acquired power price and acquires a planned value of the amount of demand from the demand planning device, and the program has the computer control the hydroelectric power planning device to plan the output according to the reduced power price and further increase the power price for the unit time at which the planned value of the amount of demand exceeds the optimal value of the amount of demand and control the demand planning device to plan the amount of demand according to the increased power price. p The other problems and the solutions for the same described by this application are exposed by the Description of Embodiments, the description of the figures, and others.

Advantageous Effects of Invention

According to the present invention, a plurality of separately calculated plans can be adjusted.

BRIEF DESCRIPTION OF DRAWINGS

FIG. 7 is a table showing an example of the price list 61.

FIG. 9 is a table showing an example of the limiting conditions list 63.

FIG. 10 is a table showing an example of the price list 61 after sorting.

FIG. 11 is a table showing an example of the output list 62 after sorting.

FIG. 12 is a table showing an example of the time table in order of output 64.

FIG. 13 is a table showing an example of the price list 61 after adjusting the power price.

FIG. 14 is a table showing an example of the list of limiting conditions 63 after adjusting the power price.

FIG. 17 is a table showing an example of the list of limiting conditions 73.

FIG. 18 is a table showing an example of the time table in order of demand 74.

FIG. 19 is a table showing an example of the price list 71 after sorting.

FIG. 20 is a table showing an example of the list of power demand 72 after sorting.

FIG. 21 is a table showing an example of the price list 71 after power price adjustment.

DESCRIPTION OF EMBODIMENTS

==Outline==

Figure 1:
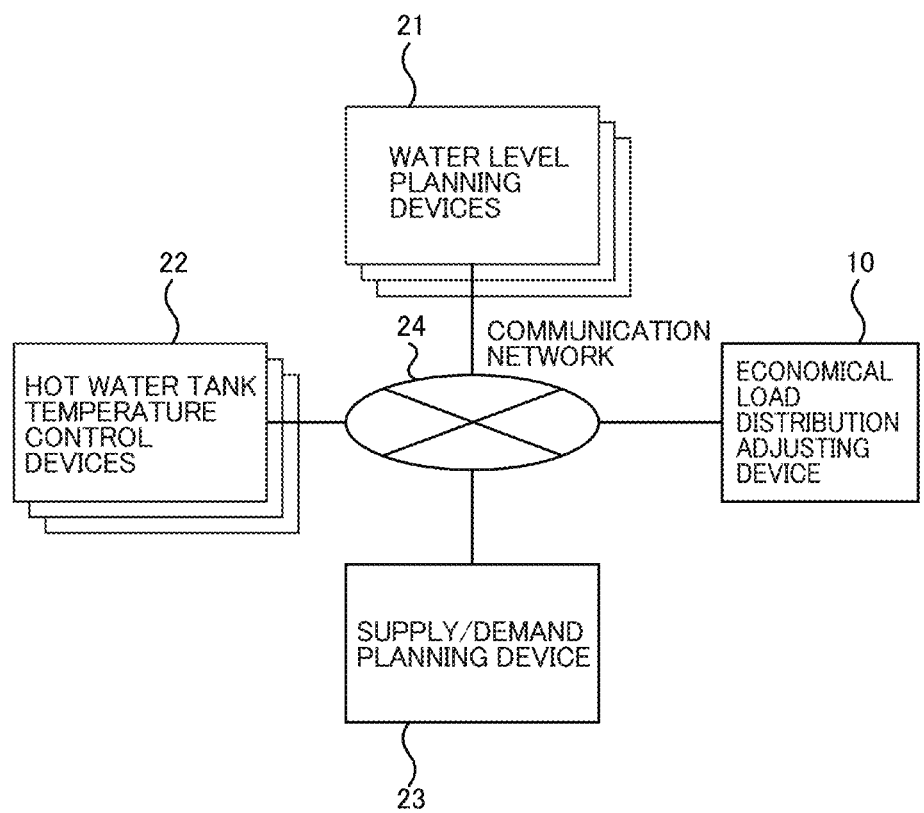
FIG. 1 is a diagram showing the overall configuration of the economical load distributing system according to the present embodiment.

Herein below, description will be given of the economical load distributing system including the economical load distribution adjusting device 10 according to an embodiment of the present invention. As shown in FIG. 1, the economical load distributing system of the present embodiment is configured to include an economical load distribution adjusting device 10, a plurality of water level planning devices 21, a plurality of hot water tank temperature control devices 22, and a supply-demand planning device 23. The economical load distribution adjusting device 10 is connected to the water level planning devices 21, the hot water tank temperature control devices 22 and the supply-demand planning device 23 via the communication network 24. The communication network 24 is, for example, the Internet or a LAN (Local Area Network) and is built with a public telephone network, the Ethernet (registered trademark), a wireless communication network or the like.

The supply-demand planning device 23 creates a plan (hereinafter "optimal supply-demand plan") for output and power demand so that the cost for generating electricity is minimized during a predetermined period (24 hours in the present embodiment). The supply-demand planning device 23 performs simulations on amount of electrical power generated by hydroelectric power generation (hereinafter "hydroelectric output"), amount of electrical power generated by thermal power generation (hereinafter "thermal output"), amount of electrical power consumed by the calorifier (hereinafter "demand of water heaters") and amount of electrical power consumed by loads other than calorifiers, to minimize 24-hour power generation cost. The supply-demand planning device 23 can calculate the optimal supply-demand plan based on, for example, a method described in the NPL 1. Note that, in NPL 1, the optimal supply-demand plan is calculated on the premise that the hydroelectric output and the power demand is provided, however, the supply-demand planning device 23 of the present embodiment is assumed to be capable of calculating the optimum value of hydroelectric output and demand for power in addition to thermal output by, for example, such as varying the hydroelectric output and demand for power. The supply-demand planning device 23 increases or decreases the hourly amount of electric power demand, hydroelectric output and thermal output according to facts such as for example, hourly power price for a unit amount of electrical power at the electric power exchange or expenses for starting up the generator for thermal power generation (start-up cost), limitations associated with the calorifier, limitations associated with loads besides the calorifier, limitations associated with power generation by those besides thermal power generation, and the like. And the supply-demand planning device 23 calculates the unit cost for power generation (hereinafter "unit power generation cost"), and further calculates the power generation expenses by multiplying the total output by the unit power generation cost and tabulating the result for 24 hours. Thereafter the supply-demand planning device 23 calculates the hydroelectric output that minimizes the power generation expenses (hereinafter "optimal output"), thermal output that minimizes the power generation expenses, output besides those by hydraulic power and thermal power that minimizes the power generation expenses, demand of water heaters that minimizes the power generation expenses (hereinafter "optimal demand"), electrical power consumed by other loads and the like. Note that, in the present embodiment, the unit power generation cost is assumed to be the power price, however, profit may be added to the unit power generation cost to be set as the power price. The supply-demand planning device 23 is, for example, a personal computer or a workstation, a mobile phone unit, PDA (Personal Digital Assistant) and the like. Further, the supply-demand planning device 23 and the later-described economical load distribution adjusting device 10 may be implemented by a single computer.

The water level planning devices 21 (corresponds to the "hydroelectric power generation planning devices" of the present invention) plan the water level of the reservoir (hereinafter "optimal water level plan") so that the selling price of power generated by hydroelectric power generation is maximized while satisfying the various limiting conditions. The water level plan made by the water level planning devices 21 can use methods disclosed in, for example, PTL 1. As the limiting conditions associated to hydroelectric power generation, there are, for example, the minimum amount of water provided (water intake) to the power generator (hereinafter "minimum water intake"), maximum amount of water intake (hereinafter "maximum water intake") and the like. The water level planning devices 21 also calculate the hourly hydroelectric output (hereafter "planned output") in the optimal water level plan. In the present embodiment, the water level planning devices 21 are assumed to be provided hourly power prices for calculating the optimal water level plan according to the provided power price. Note that, the power price may be set by adding the profit to the aforementioned unit power generation cost. The water level planning devices 21 are computers provided to each hydroelectric power station and are, for example, a personal computer or a workstation, a mobile phone unit, PDA and the like.

The hot water tank temperature control devices 22 (corresponding to the "demand planning device") plans the heating of the hot water stored in the calorifier type tank so that the electric power cost for heating is minimized while satisfying the various limiting conditions (hereinafter "optimal heating plan"). For example, the method disclosed in PTL 2 can be used in the optimal heating plan by the hot water tank temperature control devices 22. As the limiting conditions associated to heating in calorifier type tanks, there are for example, the minimum amount of power that can be carried to the calorifier type tanks (hereinafter "minimum carried current") or maximum amount thereof (hereinafter "maximum carried current"). The hot water tank temperature control devices 22 are also provided hourly power prices for calculating the optimal heating plan according to the provided power price. Additionally, the hot water tank temperature control devices 22 also calculate the hourly hot-water demand in the optimal heating plan (hereinafter "planned demand"). The hot water tank temperature control devices 22 are computers provided for each calorifier of the power demander. The hot water tank temperature control devices 22 may be, for example, control boards built in the calorifiers or may be personal computers and PDAs that connect to the calorifiers.

The economical load distribution adjusting device 10 makes adjustments so that the water level planning of the reservoir and the heat planning of the calorifiers are performed to agree as much as possible with the optimal supply-demand plan calculated by the supply-demand planning device 23. If there is a time period when the total amount of planned output that the water level planning devices 21 have planned are greater than the optimal output in the optimal supply-demand plan, the economical load distribution adjusting device 10 reduces the power price of that time period and makes the water level planning devices 21 recalculate the water level plan. Since the water level planning devices 21 plans the water level to maximize the selling price of power, the plan is expected to be corrected so that the output during the time period with the reduced power price is cut down. In this way, the output can be brought close to the optimal supply-demand plan. Further, if there is a time period when the planned demand that the hot water tank temperature control devices 22 have planned is greater than the optimal demand in the optimal supply-demand plan, the economical load distribution adjusting device 10 raises the power price of that time period and makes the hot water tank temperature control devices 22 recalculate the heating plan. Since the heating plan is calculated to minimize the consumed electric power cost at the hot water tank temperature control devices 22, the heating plan is expected to be corrected so that the electrical power consumed during the time period with increased power price is cut down. In this way, the electric power demand can be brought close to the optimal supply-demand plan.

Details will be given hereunder.

===Hardware===

Figure 2:
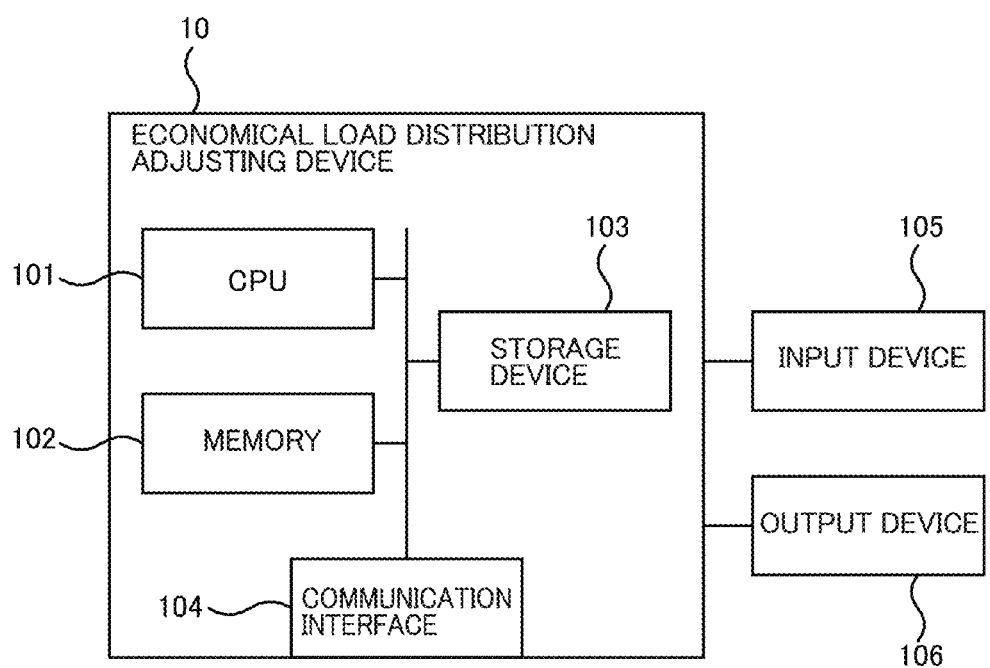
FIG. 2 is a diagram showing the hardware configuration of the economical load distribution adjusting device 10.

FIG. 2 is a diagram showing the hardware configuration of the economical load distribution adjusting device 10. The economical load distribution adjusting device 10 includes a CPU 101, a memory 102, a storage device 103, a communication interface 104, an input device 105 and an output device 106. The storage device 103 is, for example, a hard disk drive, a flash memory and the like that stores various data and programs. The CPU 101 implements various functions by reading programs stored in the storage device 103 to the memory 102 and executing the same. The communication interface 104 is an interface for connecting to the communication network 24 and is for example, an adapter for connecting to the Ethernet (registered trademark), a modem for connecting to a telephone network, a wireless communication device for connecting to a wireless communication network and the like. The input device 105 is, for example, a keyboard, a mouse, a microphone and the like that receives data inputs from the user. The output device 106 is, for example, a display, a printer, a speaker and the like that outputs data.

===Software===

Figure 3:
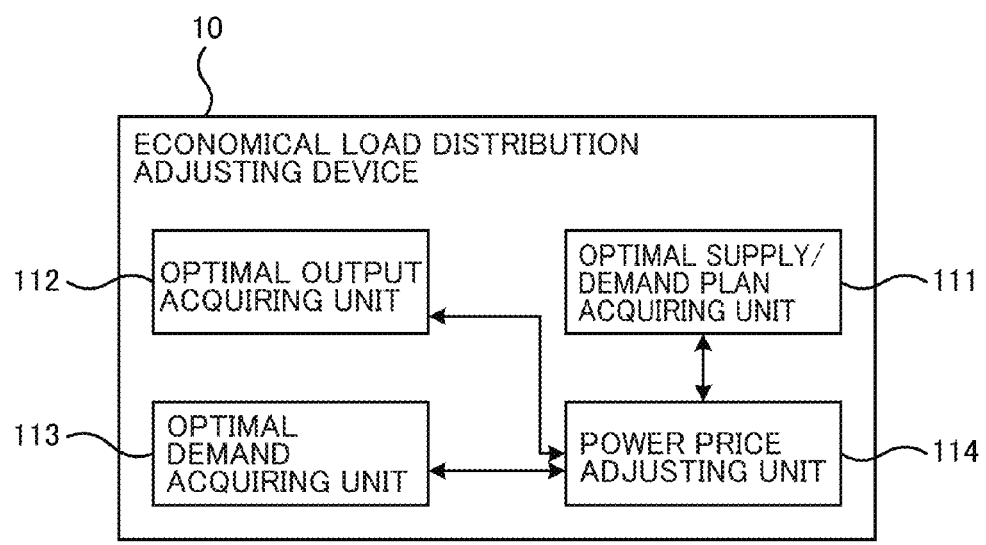
FIG. 3 is a diagram showing the software configuration of the economical load distribution adjusting device 10.

FIG. 3 is a diagram showing the software configuration of the economical load distribution adjusting device 10. The economical load distribution adjusting device 10 includes function units of an optimal supply-demand plan acquiring unit 111, an optimal output acquiring unit 112, an optimal demand acquiring unit 113 and a power price adjusting unit 114. Note that, the above functions are implemented by the CPU 101 included in the economical load distribution adjusting device 10 reading programs stored in the storage device 103 to the memory 102 and executing the same.

The optimal supply-demand plan acquiring unit 111 acquires an optimal supply-demand plan calculated by the supply-demand planning device 23. In the present embodiment, the optimal supply-demand plan acquiring unit 111 sends a command instructing to perform an optimization calculation (hereafter "optimal plan request") to the supply-demand planning device 23, the supply-demand planning device 23 calculates an optimal supply-demand plan in accordance with the optimal plan request, makes a response indicating the optimal power price, optimal demand and optimal output to the economical load distribution adjusting device 10 to be received by the optimal supply-demand plan acquiring unit 111.

The optimal output acquiring unit 112 acquires the hourly planned outputs in the optimal water level plan calculated by the water level planning devices 21. In the present embodiment, the optimal output acquiring unit 112 sends to the water level planning devices 21 an optimal plan request including the hourly optimal power price acquired from the supply-demand planning device 23. The water level planning devices 21 calculates the optimal water level plan according to the optimal plan request, makes a response indicating the hourly planned output in the optimal water level plan to the economical load distribution adjusting device 10 to be received by the optimal output acquiring unit 112.

The optimal demand acquiring unit 113 acquires the hourly planned demand in the optimal heating plan calculated by the hot water tank temperature control devices 22. In the present embodiment, the optimal demand acquiring unit 113 sends the optimal plan request including the hourly optimal power price acquired from the supply-demand planning device 23 to the hot water tank temperature control devices 22. The hot water tank temperature control devices 22 calculate the optimal heating plan according to the optimal plan request, makes a response indicating the hourly planned demand in the optimal heating plan to the economical load distribution adjusting device 10 to be received by the optimal demand acquiring unit 113.

The power price adjusting unit 114 makes the water level planning devices 21 recalculate so that the hydroelectric outputs acquired from the water level planning devices 21 agree as much as possible with the optimal supply-demand plan. The power price adjusting unit 114 also makes the hot water tank temperature control devices 22 recalculate so that the water heater demand acquired from the hot water tank temperature control devices 22 agrees as much as possible with the optimal supply-demand plan. In the present embodiment, the power price adjusting unit 114 adjusts the power price of the time period during which the total amount of planned output acquired from the water level planning devices 21 exceeds the optimal output included in the optimal supply-demand plan so to become lower than the current power price, and sends the optimal plan request including the adjusted power price to the water level planning devices 21 for recalculation thereby. Further, the power price adjusting unit 114 adjusts the power price for the time period during which the total amount of planned demand acquired from the hot water tank temperature control devices 22 exceeds the optimal demand included in the optimal supply-demand plan so to become higher than the current power price, and sends the optimal plan request including the adjusted power price to the hot water tank temperature control devices 22 for recalculation thereby.

==Process Flow Scheme==

Figure 4:
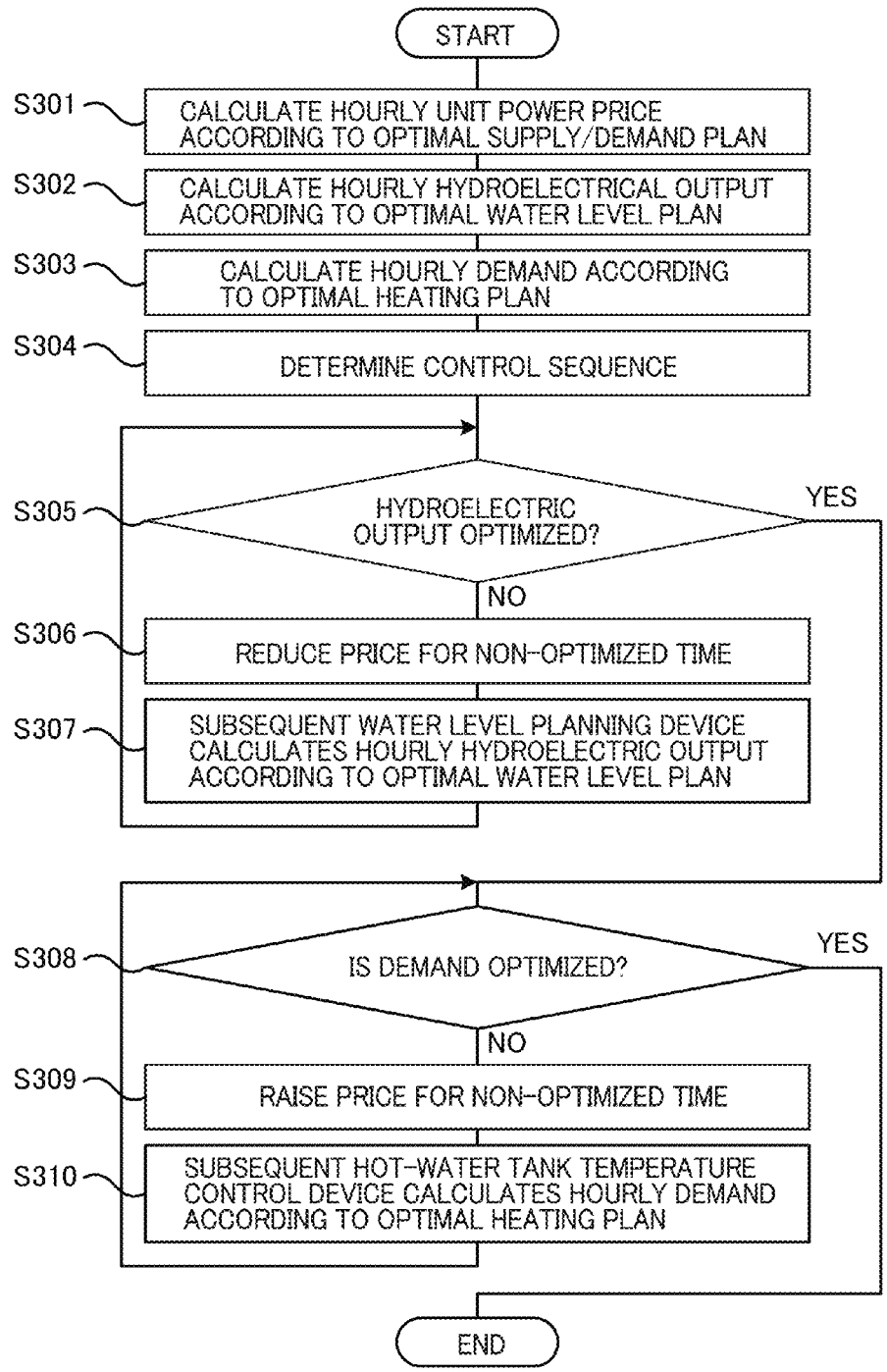
FIG. 4 is a diagram explaining the process flow scheme of the economical load distributing system.

FIG. 4 is a diagram explaining the process flow scheme of the economical load distributing system.

The supply-demand planning device 23 calculates the optimal supply-demand plan (S301), the water level planning devices 21 calculate the hourly planned output according to the optimal water level plan (S302), and the hot water tank temperature control devices 22 calculate the hourly planned output according to the optimal heating plan (S303). The economical load distribution adjusting device 10 determines the sequences of the water level planning devices 21 (power plants) and the hot water tank temperature control devices 22 (calorifiers) to be adjusted (S304). Note that, the way in which the sequence is determined will be explained later.

When there is a time at which the planned output received from the water level planning devices 21 exceeds the optimal output (S305: NO), the economical load distribution adjusting device 10 lowers the power price for such time (S306) and the water level planning devices 21 recalculates the planned output according to the optimal water level plan (S307).

The process proceeds to step S308 at any time if the planned output does not exceed the optimal output (S305: YES). If there is a time at which the planned demand received from the hot water tank temperature control devices 22 exceeds the optimal demand (308: NO), the economical load distribution adjusting device 10 raises the power price for that time (S309) and the hot water tank temperature control devices 22 recalculate the planned demand according to the optimal heating plan (S310).

Figure 5:
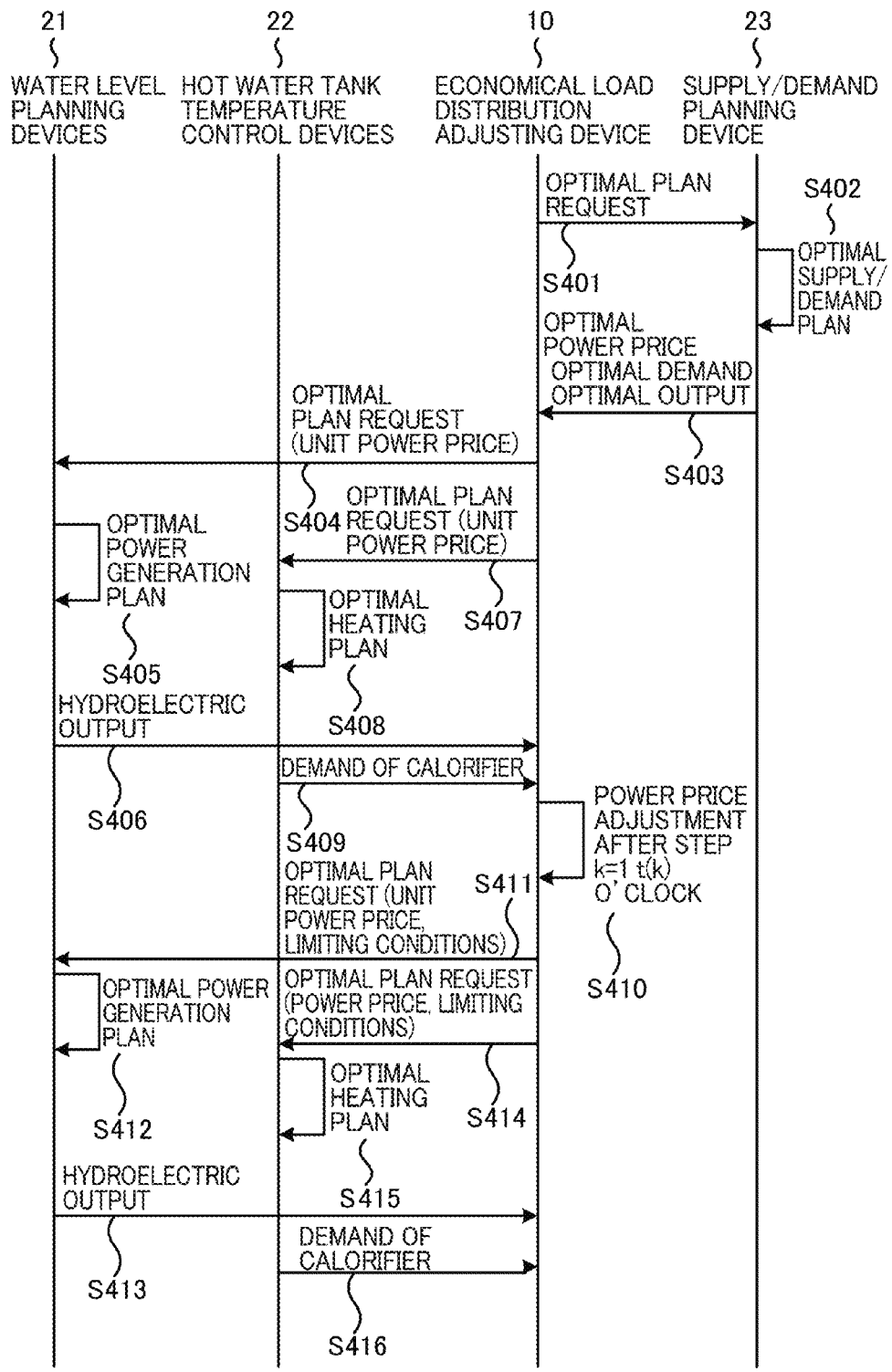
FIG. 5 is a diagram explaining the manner in which data is sent and received during the processes in FIG. 4.

FIG. 5 is a diagram explaining the manner in which data is sent and received during the processes in FIG. 4.

Steps S401-S403 correspond to step S301 in FIG. 4. The economical load distribution adjusting device 10 sends an optimal plan request to the supply-demand planning device 23 (S401). The supply-demand planning device 23 performs simulations in response to the optimal plan request to calculate the optimal supply-demand plan (S402) and sends hourly optimal power prices, optimal demand and optimal output in the optimal supply-demand plan to the economical load distribution adjusting device 10 (S403).

Steps S404-S406 correspond to step S302 in FIG. 4. The economical load distribution adjusting device 10 includes the optimal power price received from the supply-demand planning device 23 into the optimal plan request to send to each of the water level planning devices 21 (S404). Each of the water level planning devices 21 uses the power price included in the optimal plan request to create an optimal water level plan so that the selling price of hydroelectric output is maximized (S405) and returns the planned output associated with the optimal water level plan to the economical load distribution adjusting device 10 (S406).

Steps 407-S409 correspond to step S303 in FIG. 4. The economical load distribution adjusting device 10 includes the optimal power price received from the supply-demand planning device 23 into the optimal plan request to send to each of the hot water tank temperature control devices 22 (S407). Note that, the economical load distribution adjusting device 10 may be made to send the optimal plan request to the hot water tank temperature control devices 22 before step 404 when the optimal plan request is sent to the water level planning devices 21. The hot water tank temperature control devices 22 uses the optimal power price included in the optimal plan request to create an optimal heating plan so that the electric power cost for heating is minimized (S408) and sends an hourly planned demand in the optimal heating plan to the economical load distribution adjusting device 10 (S409).

Step 410 corresponds to steps S306 and S309 in FIG. 4. The economical load distribution adjusting device 10 reduces the power price of the time when the planned output exceeds the optimal output and raises the power price of the time when the planned demand exceeds the optimal demand, for time after time t(k) corresponding to the repeated number of times k of the processes indicated in steps S305-S307 or steps S308-S310 in FIG. 4 (S410). The economical load distribution adjusting device 10 can set, for example, a predetermined minimum value to the power price of the time when the planned output exceeds the optimal output and a predetermined maximum value to the power price of the time when the planned demand exceeds the optimal demand.

Steps S411-S413 correspond to steps S305 and S307 in FIG. 4. The economical load distribution adjusting device 10 sets a limiting condition (hereinafter "limiting condition for power generation adjustment") so that generated power does not vary during the adjusted time periods. For example, the economical load distribution adjusting device 10 coverts the amount of generated power to amount of water intake for time at which the price is already adjusted and sets the amount of water intake for both the minimum water intake and maximum water intake as the limiting conditions for power generation adjustment. The economical load distribution adjusting device 10 sends an optimal plan request including the reduced power price and the limiting conditions for power generation adjustment to the water level planning devices 21 (S411). The water level planning devices 21 uses the power price and the limiting conditions for power generation adjustment included in the optimal plan request to recreate an optimal water level plan that maximizes the selling price of hydroelectric power while satisfying the limiting conditions for power generation adjustment in addition to the normal limiting conditions (S412). In this way, the amount of water intake does not vary for time when the price is adjusted since the minimum water intake and the maximum water intake are the same, in other words, the amount of power generation can be kept from varying. And at the same time, for the remaining time, the water level planning devices 21 can lead such that the amount of generated power is expected to be adjusted to reduce the output during time at which the price is lowered. The water level planning devices 21 sends hourly planned output in the optimal water level plan to the economical load distribution adjusting device 10 (S413).

Steps S414-S416 correspond to steps S308 and S310 in FIG. 4. The economical load distribution adjusting device 10 sets a limiting condition (hereinafter "demand adjusting limiting condition") so that the amount of demand during the adjusted time period does not vary. For example, the economical load distribution adjusting device 10 converts the amount of demand during the price adjusted time period into an amount of carried current and sets the amount of carried current to both the minimum carried current and a maximum carried current as the demand adjusting limiting conditions. The economical load distribution adjusting device 10 sends an optimal plan request including the raised power price and the demand adjusting limiting conditions to the hot water tank temperature control devices 22 (S414). The hot water tank temperature control devices 22 uses the power price and the demand adjusting limiting conditions included in the optimal plan request to create an optimal heating plan so that the electric power cost for heating is minimized while satisfying the demand adjusting limiting conditions in addition to the normal limiting conditions (S415). In this way, the carried current does not vary since the minimum carried current and the maximum carried current are the same for the time at which the price is adjusted, in other words, the amount of demand can be kept from varying. And at the same time, for the remaining time, the hot water tank temperature control devices 22 can lead such that the amount of demand is expected to be adjusted to reduce the demand during time at which the price is raised. The hot water tank temperature control devices 22 send hourly planned demand in the optimal heating plan to the economical load distribution adjusting device 10 (S416).

The economical load distribution adjusting device 10 repeats the processes from step S410 to step S416 until the planned output is equal to or less than the optimal output and the planned demand is equal to or less than the optimal demand for all the time, or the optimal water level plan and the optimal heating plan are recreated for all the water level planning devices 21 and all the hot water tank temperature control devices 22.

In the foregoing manner, the optimal water level plan and the optimal heating plan are adjusted in each of the water level planning devices 21 and each of the hot water tank temperature control devices 22 so that the optimal output and the optimal demand in the optimal supply-demand plan are reached as much as possible.

==Adjustment of Power Prices (Hydroelectric Power Plant)==

Figure 6:
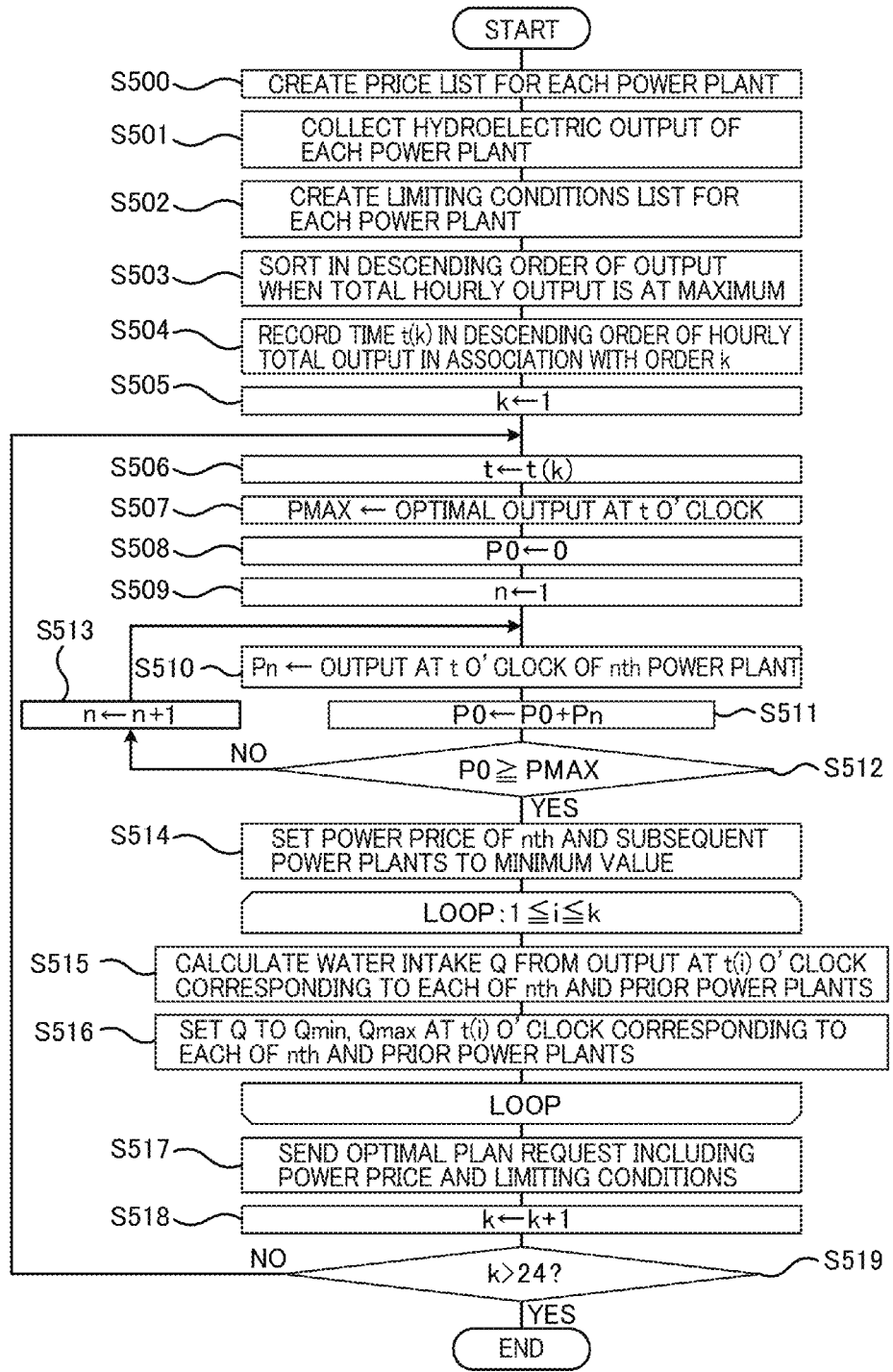
FIG. 6 is a diagram explaining the flow of the power price adjustment process to be sent to the water level planning device 21.

FIG. 6 is a diagram explaining the flow of the adjustment process of the power price to be sent to the water level planning device 21 of step S306 in FIG. 4 and step S410 in FIG. 5.

Figure 8:
FIG. 8 is a table showing an example of the output list 62.

The economical load distribution adjusting device 10 creates a price list 61 that stores the optimal power prices received from the supply-demand planning device 23 in association with the hydroelectric power plants (S500). FIG. 7 is a table showing an example of the price list 61. In the present embodiment, the price list 61 stores therein the prices with the hydroelectric power plants in the column direction and time in the row direction. The economical load distribution adjusting device 10 creates an output list 62 that stores hourly planned output received from the water level planning devices 21 for each hydroelectric power plant (S501). FIG. 8 is a table showing an example of an output list 62. In the present embodiment, the output list 62 also stores hydroelectric output with the hydroelectric power plants in the column direction and time in the row direction. Further, the economical load distribution adjusting device 10 sums up the planned output corresponding to each hydroelectric power plant for each time to be set in the hourly total column 621 of the output list 62. Furthermore, the economical load distribution adjusting device 10 creates a limiting conditions list 63 that stores limiting conditions of each plant for each power plant and sets the limiting conditions as the initial values (S502). FIG. 9 is a table showing an example of the limiting conditions list 63. Note that, in the present embodiment, the limiting conditions assume only the minimum water intake (Qmin) and maximum water intake (Qmax). Additionally, the initial values of the limiting conditions for all the hydroelectric power plants take the same value.

The economical load distribution adjusting device 10 specifies the beginning of time when the hourly total is maximized and sorts the columns of the price list 61 and the output list 62 in descending order of output of hydroelectric power plants at that time (S503). FIGS. 10 and 11 show an example where the maximum hourly total of 750 is at 13 o'clock and the columns of the price list 61 and the output list 62 are sorted in accordance with the output at 13 o'clock to be in the order of power plant 5, power plant 4, power plant 3, power plant 2 and power plant 1 from the left. The columns were sorted from the left in the present invention, however, it is a matter of course that the columns may be sorted from the right.

The economical load distribution adjusting device 10 records time t(k) in association with order k in the descending order of hourly totals of the output list 62 in the time table in order of output 64 shown in FIG. 12 (S504). The economical load distribution adjusting device 10 sets 1 to variable k (S505), reads t(k) corresponding to k from the time table in order of output 64 to be set as t (S506). In the example shown in FIG. 12, for example, if k is 1, t(k) would be "13". Note that, in the case there is a plurality of times at which the hourly totals are of the same value, the time to be set to t is selected by a predetermined method, for example, selecting the earliest time and the like. The economical load distribution adjusting device 10 sets the optimal output at time t as PMAX (S507), sets zero to variable P0 (S508) and sets 1 to variable n (S509). The economical load distribution adjusting device 10 adds the hydroelectric output at t o'clock at the $n^{th}$ power plant, in other words, sets the value corresponding to t o'clock of the $n^{th}$ column from the left in the output list 62 to Pn (S510) and adds Pn to P0 (S511).

If P0 is less than PMAX (S512: NO), the economical load distribution adjusting device 10 increments n (S513) and repeats the processes from step S510.

When P0 becomes equal to PMAX or greater (S512: YES), the economical load distribution adjusting device 10 sets the power price of the power plants subsequent to the $n^{th}$ power plant, in other words, the value corresponding to t o'clock of the power plants after the $n^{th}$ one from the left in the price list 61, to a predetermined minimum value (S514). In the example of FIG. 13, the minimum value is assumed to be "0.01". For example, when n is 5 and t is 13, the power price 611 at 13 o'clock becomes 0.01 only for power plant 1.

The economical load distribution adjusting device 10 performs the following processes for variable i starting from 1 and ending with k. The economical load distribution adjusting device 10 reads t(i) from the time table in order of output 64 for the $n^{th}$ and preceding power plants, acquires the output in the output list 62 corresponding to t(i) o'clock and converts the acquired output to water intake Q (S515). As disclosed in PTL 1, for example, equation $Pn=Qn \times hn \times c \times g$ holds true where Pn is the generated amount of electricity, Q is the water intake, hn is the effective drop, c is the coefficient associated to the conversion efficiency and g is the gravitational acceleration. In the present embodiment, the effective drop hn and the coefficient c associated to the conversion efficiency are assumed to take the same value for all the power plants and therefore, the water intake Q may be calculated from the output with the above equation. The economical load distribution adjusting device 10 sets the calculated water intake Q to both the minimum water intake and maximum water intake of the limiting conditions list 63 corresponding to t (i) o'clock for the $n^{th}$ and previous power plants (S516). In this way, the water intake Q at t (i) o'clock is prevented from being varied for the first to $n^{th}$ power plants. And therefore, the output at t (i) o'clock can be prevented from varying when the water level planning devices 21 recalculate the optimal water level plan.

The above processes are repeated for i starting from 1 and ending with k, and the minimum water intake and the maximum water intake corresponding to t (i) o'clock are set with the aforementioned converted water intake for power plants whose power prices are not adjusted. In the example of FIG. 14, the minimum water intake and the maximum water intake at 13 o'clock are set the same values for each of power plant 2 and power plant 5.

The economical load distribution adjusting device 10, for each of the hydroelectric power plants, reads the power price for each time from the price list 61, reads the limiting conditions (minimum water intake and maximum water intake) for each time from the limiting conditions list 63, sends an optimal plan request including the read power price and the limiting conditions to the water level planning devices 21 (S517) and makes the water level planning devices 21 recalculate the optimal water level plan. The economical load distribution adjusting device 10 increments k (S518). The economical load distribution adjusting device 10 repeats the processes from step 506 if the processes for all the times are not performed yet, that is, if k is 24 or less (S519: NO), and terminates the process if k is greater than 24 (S519: YES).

Figure 15:
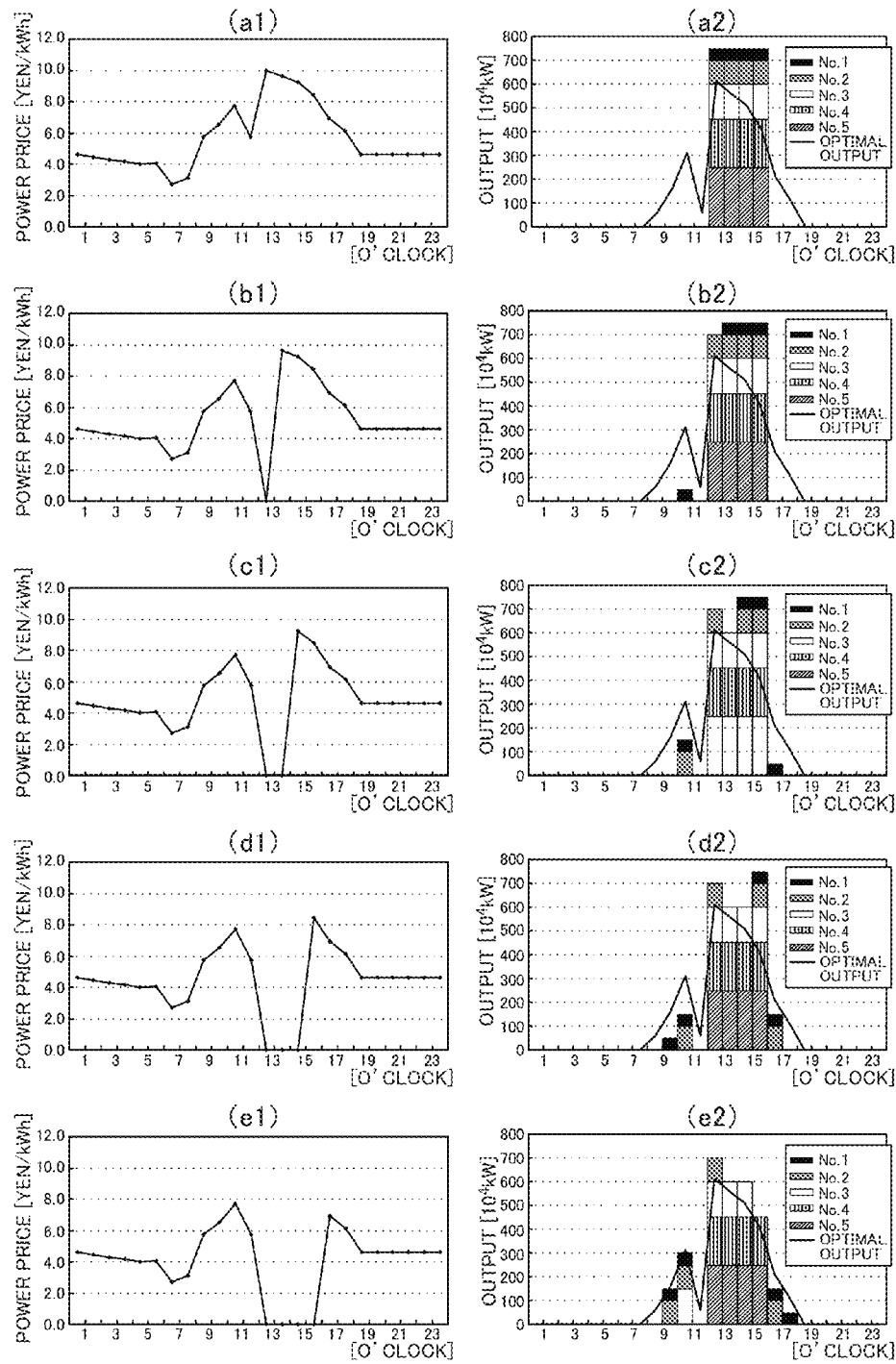
FIG. 15 shows diagrams explaining the power price adjustment processes shown in FIG. 6.

FIG. 15 shows diagrams explaining the power price adjustment processes shown in aforementioned FIG. 6. (a1) shows a graph indicating the optimal power price calculated by the supply-demand planning device 23, (a2) shows a line graph of the optimal output and a stacked bar chart of the planned output calculated by each of the water level planning devices 21 according to the optimal power price. In the example shown in FIG. 15, the total planned output exceeds the optimal output between 13 o'clock and 16 o'clock. When the power price of power plant 1 whose total planned output exceeds the optimal output at 13 o'clock is lowered (b1), the water level planning devices 21 of power plant 1 are expected to increase the outputs at other times to maximize the selling price of power. In the example of (b2), power generation planned at 13 o'clock is shifted to 11 o'clock. The power prices at power plants 1 and 2 are lowered at 14 o'clock (c1) and thereby the water level planning devices 21 of power plant 1 have shifted the power generation planned at 14 o'clock to 17 o'clock and the water level planning devices 21 of power plant 2 have shifted the power generation planned at 14 o'clock to 11 o'clock to maximize the selling price of power (c2). Similarly, the power price at power plant 1 is lowered at 15 o'clock (d1) and the power generation planned at 15 o'clock is shifted to 10 o'clock (d2). The power prices at power plants 1-3 are lowered at 16 o'clock (e1) and the planned outputs at 16 o'clock are shifted to 18 o'clock at power plant 1, shifted to 10 o'clock at power plant 2 and shifted to 11 o'clock at power plant 3 (e2). In this way, power generation plans are laid at (e2) by each of the water level planning devices 21 in conditions approximately agreeing with the optimal output.

As explained above, the economical load distribution adjusting device 10 in the economical load distributing system of the present embodiment can make the water level planning devices 21 recalculate the water level plan after setting the power price, to a minimum value, of a time period where the planned output is greater than the optimal output if such time period exists. Since the water level is planned to maximize the selling price of power by the water level planning devices 21, the plan is expected to be corrected to reduce the output of time periods having the lowered power prices. In this way, the output can be brought close to the optimal supply-demand plan.

==Adjustment of Power Price (Calorifier)==

Figure 16:
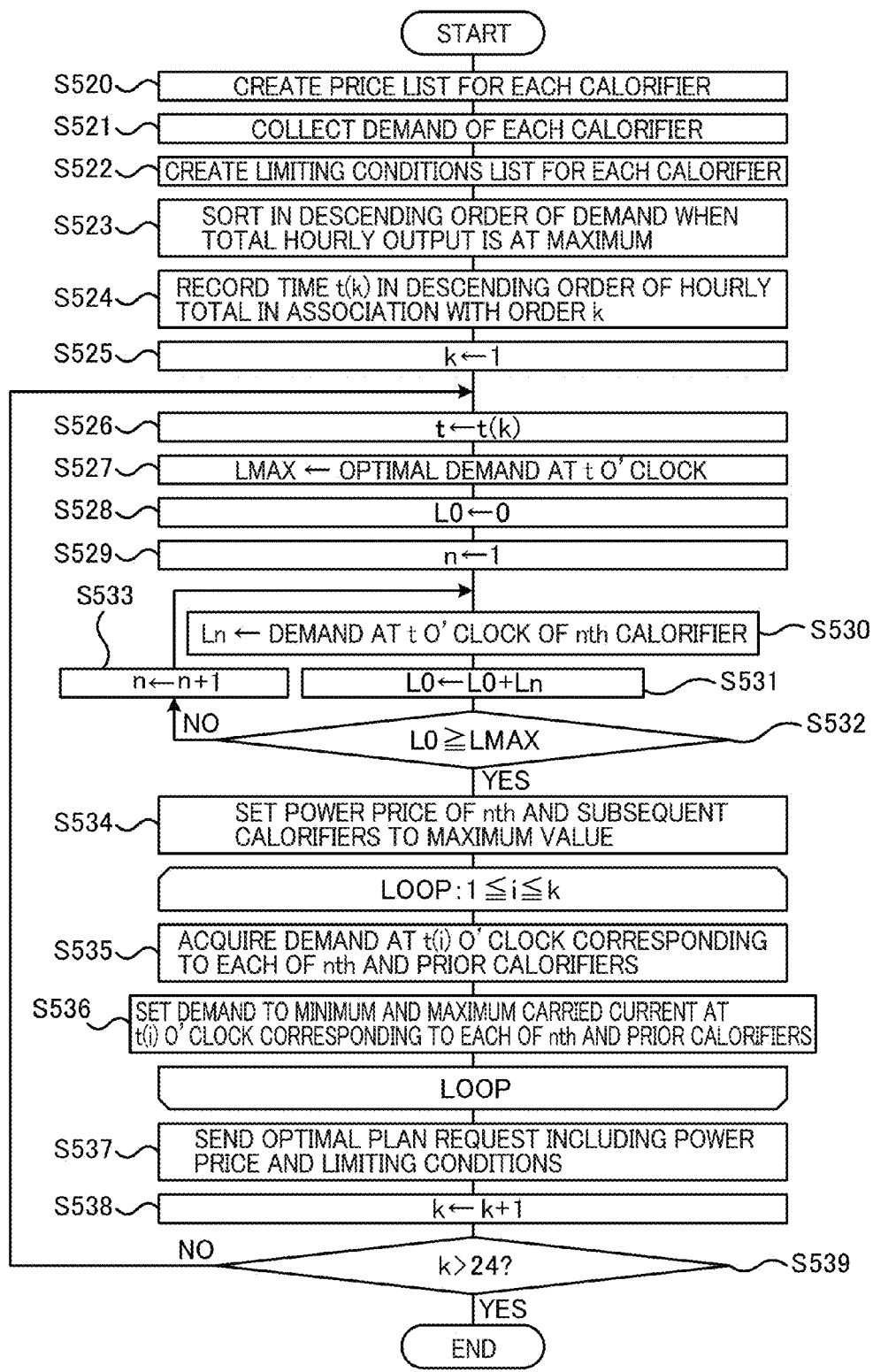
FIG. 16 is a flowchart explaining the adjustment process flow for the power price to be sent to the hot water tank temperature control device 22.

FIG. 16 is a flowchart explaining the adjustment process flow for the power price to be sent to the hot water tank temperature control device 22 in step S309 of FIG. 4 and step S410 of FIG. 5.

The economical load distribution adjusting device 10 creates price list 71 that stores therein the optimal power price received from the supply-demand planning device 23, in association with the calorifiers (S520). In the present embodiment, the price list 71 stores therein the prices with the calorifiers in the column direction and time in the row direction. The economical load distribution adjusting device 10 creates a demand list 72 that stores for each calorifier the planned demand received from the hot water tank temperature control devices 22 (S521). In the present embodiment, the demand list 72 also stores demand with the calorifiers in the column direction and time in the row direction. Further, the economical load distribution adjusting device 10 sums up the planned demand corresponding to each calorifier for each time to set in the hourly total column 651 of the demand list 72. Furthermore, the economical load distribution adjusting device 10 creates a limiting conditions list 73 that stores limiting conditions of each time for each calorifier and sets the limiting conditions as the initial values (S522). FIG. 17 is a table showing an example of the limiting conditions list 73. Note that in the present embodiment, the limiting conditions assume only the minimum carried current and the maximum carried current. Additionally, the initial values of the limiting conditions for all the calorifiers take the same value.

The economical load distribution adjusting device 10 specifies the beginning of time when the hourly total is maximized and sorts the columns of the calorifiers in the price list 71 and the demand list 72 in descending order of demand at that time (S523). FIGS. 19 and 20 show examples of the price list 71 and the demand list 72 after sorting. In the examples shown in FIGS. 19 and 20, the columns of the price list 71 and the demand list 72 are sorted in the order of calorifier 3, calorifier 1 and calorifier 2 from the left.

The economical load distribution adjusting device 10 records time t(k) in association with order k in descending order of hourly totals of the demand list 62 in the time table in order of demand 74 shown in FIG. 18 (S524). The economical load distribution adjusting device 10 sets 1 to variable k (S525) reads t(k) corresponding to k from the time table in order of demand 74 to set as t (S526). In the example shown in FIG. 20, for example, if the hourly total of "150" at 5 o'clock is the maximum value, t would be "5". Note that, in the case there is a plurality of times at which the hourly totals are of the same value, the time to be set to t is selected by a predetermined method, for example, selecting the earliest time and the like. The economical load distribution adjusting device 10 sets the optimal demand at t o'clock as LMAX (S527), sets zero to variable L (S528) and sets to variable n (S529). The economical load distribution adjusting device 10 adds the planned demand at t o'clock of the $n^{th}$ calorifier, in other words sets the value corresponding to t o'clock of the $n^{th}$ column form the left in the demand list 72 to Ln (S530) and adds Ln to L0 (S531).

If L0 is less than LMAX (S532: NO), the economical load distribution adjusting device 10 increments n (S533) and repeats the processes from step S530.

When L0 becomes LMAX or greater (S532: YES), the economical load distribution adjusting device 10 sets the power price of the $n^{th}$ and its subsequent calorifiers, in other words, the value corresponding to t o'clock of the calorifiers after the $n^{th}$ one from the left in the price list 71 to a predetermined maximum value (S534). In the example of FIG. 21, the maximum value is assumed to be "99". For example, when n is 1 and t is 5, the power price 711 at 5 o'clock becomes 99 for calorifiers except calorifier 3.

The economical load distribution adjusting device 10 performs the following processes for variable i starting from 1 and ending with k. The economical load distribution adjusting device 10 reads t(i) from the time table in order of demand 74 for the $n^{th}$ and preceding calorifiers, acquires the demand in the demand list 72 corresponding to t(i) o'clock (S535). The economical load distribution adjusting device 10 sets the acquired demand to both the minimum carried current and the maximum carried current of the limiting conditions list 73 corresponding to t(i) o'clock for the $n^{th}$ and preceding calorifiers (S536). In this way, the carried current at t (i) o'clock is prevented from being varied for the first to $n^{th}$ power plants. And therefore, the demand at t (i) o'clock can be prevented from varying when the hot water tank temperature control devices 22 recalculate the optimal heating plan.

The above processes are repeated for i starting from 1 and ending with k, and the acquired demand is set to both the minimum carried current and the maximum carried current corresponding to t(i) o'clock for the calorifiers that do not have the power prices adjusted.

The economical load distribution adjusting device 10, for each of the calorifiers, reads the power price for each time from the price list 71, reads the limiting conditions (minimum carried current and maximum carried current) for each time from the limiting conditions list 73, sends the optimal plan request including the read power price and the limiting conditions to the hot water tank temperature control devices 22 (S537) and makes the hot water tank temperature control devices 22 recalculate the optimal heating plan. The economical load distribution adjusting device 10 increments k (S538). The economical load distribution adjusting device 10 repeats the processes from step 526 when the processes for all the times are not performed yet, that is, if k is 24 or less (S539: NO), and terminates the process if k is greater than 24 (S539: YES).

Figure 22:
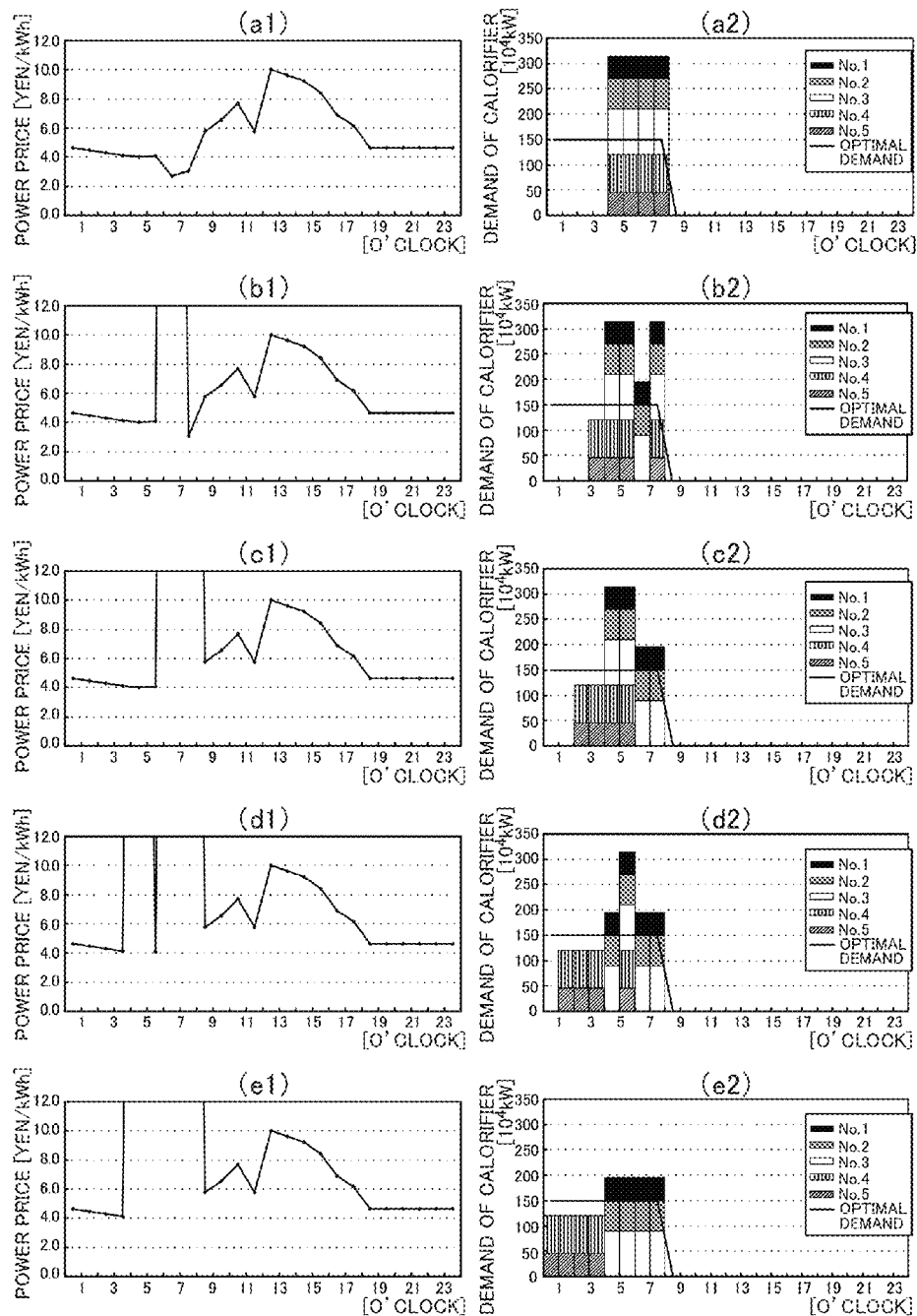
FIG. 22 shows diagrams explaining the power price adjustment processes shown in FIG. 16.

FIG. 22 shows diagrams explaining the power price adjustment processes shown in aforementioned FIG. 16. (a1) shows a graph indicating the optimal power price calculated by the supply-demand planning device 23, (a2) shows a line graph of the optimal demand and a stacked bar chart of the planned demand calculated by each of the hot water tank temperature control devices 22 according to the optimal power price. In the example shown in FIG. 22, the total planned demand exceeds the optimal demand between 5 o'clock and 8 o'clock. When the power price of the calorifiers 4 and 5 are raised at 7 o'clock at which the total planned demand exceeds the optimal demand (b1), the hot water tank temperature control devices 22 controlling the calorifiers 4 and 5 are expected to reduce the demand for time at which the power price is raised and to increase the demand at other times to minimize the electric power cost associated with consumed power. In the example of (b2), heating by calorifier 5 planned at 7 o'clock is shifted to 4 o'clock. The power prices for calorifiers 4 and 5 are raised at also 8 o'clock (c1) and hereby the hot water tank temperature control devices 22 of the calorifiers 4 and 5 shift the heating planned at 8 o'clock to 3 o'clock in order to minimize the electric power cost. The power prices for calorifiers 4 and 5 are raised at also 5 o'clock (d1) and the heating planned at 5 o'clock is shifted to 2 o'clock (d2), and the power prices for calorifiers 4 and 5 are raised at also 6 o'clock (e1) and the heating planned at 6 o'clock is shifted to 1 o'clock (e2). In this way, heating plans are laid at (e2) by each of the hot water tank temperature control devices 22 in conditions approximately agreeing with the optimal output.

As explained above, the hot water tank temperature control devices 22 can be made to recalculate the heating plan after setting the power price, to a maximum value, of a time period where the planned demand is greater than the optimal demand if such time period exists. Since the heating plan is recalculated to minimize the electric power cost for heating by the hot water tank temperature control devices 22, the heating plan is expected to be corrected to reduce the consumed power of time periods having the raised power price. In this way, the power demand can be brought close to the optimal supply-demand plan.

Note that in the present embodiment, the economical load distributing system was assumed to have placed a plurality of water level planning devices 21, however, there may be a case where only a single water level planning device 21 is placed. Similarly, there may be a case where only a single hot water tank temperature control device 22 is placed. Further, there may be only one or more hot water tank temperature control devices 22 placed without placing a water level planning device 21 or reversely, only one or more water level planning devices 21 placed without placing a hot water tank temperature control device 22.

Additionally, in the present embodiment, the economical load distribution adjusting device 10 was made to recalculate the optimal plan for each of the water level planning devices 21 and the hot water tank temperature control devices 22, however, an optimal plan for only either the water level planning devices 21 or the hot water tank temperature control devices 22 may be recalculated.

Further, in the present embodiment, the planning of demand was made to be conducted by the hot water tank temperature control devices 22 connected to the calorifiers, however, the hot water tank temperature control devices 22 may be made to adjust the consumed power of not only the calorifiers but of various electrical appliances such as refrigerators, freezers, air conditioners, capacitors and the like.

Furthermore, in the present embodiment, the limiting conditions associated with hydroelectric power generation assumed only the minimum water intake and maximum water intake, however, other limiting conditions may be set as long as the limiting conditions do not vary from the previous output even when the optimal water level plan is recalculated.

Yet further still, the initial value of the limiting conditions of all the hydroelectric power plants were assumed to be the same, however, the economical load distribution adjusting device 10 can be made to acquire the limiting conditions from the water level planning devices 21.

Even further still, the effective drop hn of all the hydroelectric power plans were assumed to be the same, however, the economical load distribution adjusting device 10 can be made to store the hns of each hydroelectric power plants and read them.

Even further still, the price lists 71 and the demand lists 72 were assumed to be created for each calorifier in the present embodiment, however, the price lists 71 and the demand lists 72 may be standardized for each area where the calorifiers are placed when a large number of calorifiers are placed. In this case, for example, the hot water tank temperature control devices 22 sends to the economical load distribution adjusting device 10 area information indicating the area where the calorifiers are placed together with hourly hot-water demand. The economical load distribution adjusting device 10 sums up the hourly hot water demand sent from the hot water tank temperature control devices 22 in the same area and stores in the demand list 72 the hourly hot water demand in association with the area information. Further, the economical load distribution adjusting device 10 stores the power price for each area information in the price list 71. In this way, calculation load associated with the power price adjustment processes can be relieved when a large number of calorifiers are set.

Hereinabove, description was given of embodiments of the present invention, however, the above-described embodiment is intended to facilitate understanding of the present invention and should not be construed as limited to the embodiments set forth here. The present invention may be modified and improved without departing from the scope of the invention, and equivalents thereof are also encompassed by the invention.

REFERENCE SIGNS LIST 10 economical load distribution adjusting device
21 water level planning devices
22 hot water tank temperature control devices
23 supply-demand planning device
24 communication network
101 CPU
102 memory
103 storage device
104 communication interface
105 input device
106 output device
111 optimal supply-demand plan acquiring unit
112 optimal output acquiring unit
113 optimal demand acquiring unit
114 power price adjusting unit

The invention claimed is:

1. A hydroelectric power plan adjusting device for adjusting a plan of the hydroelectric power, communicatively connected to each of a supply-demand planning device, and a plurality of hydroelectric power planning devices, the supply-demand planning device calculating an optimal value of output per unit time by hydroelectric power generation and an optimal value of electric power demand per unit time of an electrical equipment as well as calculating a first power price which is an optimal value of power price per the unit time, and each of the hydroelectric power planning devices planning an output by the hydroelectric power generation in accordance with a given power price, the device comprising:

an optimal supply-demand plan acquiring unit configured to acquire from the supply-demand planning device an optimal value of the output and the first power price per the unit time;

an optimal output acquiring unit configured to control each of the plurality of hydroelectric power planning devices to calculate a planned value of the output according to the first power price and acquire the planned value of the output from each of the hydroelectric power planning devices;

a price adjusting unit configured to generate a second power price updated by reducing the first power price for the unit time based on a determination that the total amount of the planned values of the outputs exceeds the optimal value of the output for the unit time and controls at least one of the plurality of hydroelectric power planning devices so that a planned value of an output is recalculated according to the generated second power price; and a unit configured to adjust the amount of the water intake to at least one reservoir in at least one hydroelectric power station in accordance with the recalculated planned value of the output.

2. The hydroelectric power plan adjusting device according to claim 1, wherein the supply-demand planning device calculates an optimal value of the output by the hydroelectric power generation and an optimal value of power demand of an electrical equipment, and calculates the first power price according to the optimal value of the output and the optimal value of the amount of demand, the hydroelectric power plan adjusting device further includes an optimal demand acquiring unit configured to control the demand planning device to plan an amount of demand according to the first power price and acquires a planned value of the amount of demand from the demand planning device, and the price adjusting unit further generates a third power price updated by raising the first power price for the unit time based on a determination that the planned value of the amount of demand exceeds the optimal value of the amount of demand for the unit time and controls at least one of the demand planning device so to plan the amount of demand according to the raised power price.

3. The hydroelectric power plan adjusting device according to claim 2, wherein the price adjusting unit sets a predetermined maximum value to the second power price for the unit time based on a determination that the planned value of the amount of demand exceeds the optimal value of the amount of demand for the unit time.

4. The hydroelectric power plan adjusting device according to claim 2, wherein the price adjusting unit sets a predetermined minimum value to the second power price for the unit time based on a determination that the planned value of the amount of demand exceeds the optimal value of the amount of demand for the unit time.

5. The hydroelectric power plan adjusting device according to claim 1, wherein the price adjusting unit sets a predetermined minimum value to the second power price for the unit time based on a determination that the planned value of the amount of demand exceeds the optimal value of the amount of demand for the unit time.

6. A method of adjusting a plan of hydroelectric power plan, the method executed by a computer communicatively connected to each of a supply-demand planning device, and a plurality of hydroelectric power planning devices, the supply-demand planning device calculating an optimal value of output per unit time by hydroelectric power and an optimal value of electric power demand per unit time of an electrical equipment as well as calculating a first power price which is an optimal value of power price per the unit time, and each of the hydroelectric power planning devices planning output by the hydroelectric power in accordance with a given power price, the method comprising:

acquiring from the supply-demand planning device an optimal value of the output and the first power price per the unit time;

controlling each of the plurality of hydroelectric power planning devices to calculate a planned value of the output according to the first power price and acquiring the planned value of the output from each of the hydroelectric power planning devices;

generating a second power price updated by reducing the first power price for the unit time based on a determination that the total amount of the planned values of the outputs exceeds the optimal value of the output for the unit time and controlling at least one of the plurality of hydroelectric power planning devices so that the output is recalculated according to the generated second power price; and adjusting the amount of the water intake to at least one reservoir in at least one hydroelectric power station in accordance with the recalculated planned value of the output.

7. The hydroelectric power adjusting method, according to claim 6, wherein the supply-demand planning device has calculated an optimal value of the output by the hydroelectric power generation and an optimal value of power demand of an electrical equipment, and calculates the first power price according to the optimal value of the output and the optimal value of the amount of demand, the computer further controls the demand planning device to plan the amount of demand according to the first power price and acquires a planned value of the amount of demand from the demand planning device, and the computer further generates a third power price updated by increasing the first power price for the unit time based on a determination that the planned value of the amount of demand exceeds the optimal value of the amount of demand for the unit time and controls the demand planning device to plan the amount of demand according to the increased power price.

8. A non-transitory computer-readable medium storing a computer-executable program for adjusting a plan of hydroelectric power generation, the program making a computer, communicatively connected to each of a supply-demand planning device, and a plurality of hydroelectric planning devices, the supply-demand planning device calculating an optimal value of output per unit time by hydroelectric power and an optimal value of electric power demand per unit time of an electrical equipment as well as calculating a first power price which is an optimal value of power price per the unit time, and each of the hydroelectric planning devices planning output by the hydroelectric power in accordance with a given power price, the program causing the computer to perform:

a step of acquiring from the supply-demand planning device an optimal value of the output and the first power price per the unit time;

a step of controlling each of the plurality of hydroelectric power planning devices to calculate a planned value of the output according to the first power price and acquiring the planned value of the output from each of the hydroelectric planning devices;

a step of generating a second power price updated by reducing the first power price for the unit time based on a determination that the total amount of the planned values of the outputs exceeds the optimal value of the output for the unit time and controlling at least one of the hydroelectric power planning devices so that a planned value of an output is recalculated according to the generated second power price; and a step of adjusting the amount of the water intake to at least one reservoir in at least one hydroelectric power station in accordance with the recalculated planned value of the output.

9. The program according to claim 8, wherein the supply-demand planning device has calculated an optimal value of the output by the hydroelectric power generation and an optimal value of power demand of an electrical equipment, and calculates the first power price according to the optimal value of the output and the optimal value of the amount of demand, the program has the computer further perform a step of controlling the demand planning device to plan the amount of demand according to the first power price and acquires a planned value of the amount of demand from the demand planning device, and the program has the computer further generate a third power price updated by increasing the first power price for the unit time based on a determination that the planned value of the amount of demand exceeds the optimal value of the amount of demand for the unit time and control the demand planning device to plan the amount of demand according to the generated second power price.

* * * * *